(12) United States Patent
Tagge et al.

(10) Patent No.: US 7,105,587 B2
(45) Date of Patent: Sep. 12, 2006

(54) METHOD AND COMPOSITION FOR POLYMER-REINFORCED COMPOSITE CEMENTITIOUS CONSTRUCTION MATERIAL

(75) Inventors: Christopher D. Tagge, San Carlos, CA (US); Jacob Freas Pollock, Berkeley, CA (US); David S. Soane, Piedmont, CA (US); Ken Saito, Berkeley, CA (US); Lennard F. Torres, Pleasanton, CA (US)

(73) Assignee: Innovative Construction and Building Materials, Emeryville, CA (US)

( * ) Notice: Subject to any disclaimer, the term of this patent is extended or adjusted under 35 U.S.C. 154(b) by 338 days.

(21) Appl. No.: 10/278,214

(22) Filed: Oct. 21, 2002

(65) Prior Publication Data

US 2003/0092784 A1 May 15, 2003

Related U.S. Application Data

(63) Continuation-in-part of application No. 10/094,572, filed on Mar. 7, 2002, now Pat. No. 6,713,830.
(60) Provisional application No. 60/273,925, filed on Mar. 7, 2001.

(51) Int. Cl.
*C08J 9/00* (2006.01)

(52) U.S. Cl. .................. 524/3; 521/83; 524/4; 524/5

(58) Field of Classification Search ............ 521/83, 521/57, 76, 89; 524/3, 4, 5, 423; 523/219, 523/205, 211

See application file for complete search history.

(56) References Cited

U.S. PATENT DOCUMENTS

| | | | |
|---|---|---|---|
| 3,878,278 A | 4/1975 | Miller et al. ............ 264/45.3 |
| 3,989,534 A | 11/1976 | Plunguian et al. ........... 106/86 |
| 4,137,198 A | 1/1979 | Sachs ........................ 521/154 |
| 4,148,781 A | 4/1979 | Narukawa et al. ......... 260/42.51 |
| 4,153,470 A | 5/1979 | Stahl et al. ................ 106/116 |
| 4,265,964 A | 5/1981 | Burkhart .................... 428/306 |
| 4,330,589 A | 5/1982 | Saito et al. ............... 428/312.4 |
| 4,487,864 A | 12/1984 | Bermudez et al. ............ 524/2 |
| 4,518,652 A | 5/1985 | Willoughby ............... 428/312.4 |
| 4,778,529 A | 10/1988 | Barker et al. ............... 106/93 |
| 4,808,360 A | 2/1989 | Natori et al. ................ 264/221 |
| 4,845,207 A | 7/1989 | t'Sas ............................ 536/91 |
| 4,902,348 A | 2/1990 | Kossatz et al. ............. 106/111 |
| 4,923,538 A | 5/1990 | Hill .............................. 156/78 |
| 4,949,518 A | 8/1990 | Nagel et al. .................. 52/239 |
| 4,994,113 A | 2/1991 | Helmstetter ................ 106/618 |
| 5,109,030 A | 4/1992 | Chao et al. .................. 521/83 |
| 5,194,091 A | 3/1993 | Laney ......................... 106/611 |
| 5,344,490 A | 9/1994 | Roosen et al. ............. 106/778 |
| 5,385,607 A | 1/1995 | Kiesewetter et al. ..... 106/197.1 |
| 5,387,626 A | 2/1995 | Böhme-Kovac et al. ...... 524/35 |
| 5,401,798 A | 3/1995 | Rasp et al. ................. 524/423 |
| 5,414,970 A | 5/1995 | Bontrager et al. ........... 52/408 |
| 5,432,215 A | 7/1995 | Girg et al. ................... 524/28 |
| 5,482,551 A | 1/1996 | Morris et al. .............. 106/772 |
| 5,590,501 A | 1/1997 | Stoddart et al. ............. 52/408 |
| 5,641,584 A | 6/1997 | Andersen et al. .......... 428/703 |
| 5,658,656 A | 8/1997 | Whitney et al. ........ 428/304.4 |
| 5,765,334 A | 6/1998 | Vitous ..................... 52/745.19 |
| 5,817,262 A | 10/1998 | Englert ......................... 264/86 |
| 5,879,486 A | 3/1999 | Philips et al. ................ 156/39 |
| 5,879,825 A | 3/1999 | Burke et al. ............... 428/703 |
| 5,888,322 A | 3/1999 | Holland ....................... 156/39 |
| 5,888,642 A | 3/1999 | Meteer et al. ............ 428/313.5 |
| 5,945,208 A | 8/1999 | Richards et al. .......... 428/294.7 |
| 6,042,665 A | 3/2000 | Kiraly et al. ................ 156/39 |
| 6,074,551 A * | 6/2000 | Jones et al. ................. 210/106 |
| 6,162,839 A | 12/2000 | Klauck et al. ................ 521/83 |
| 6,171,388 B1 | 1/2001 | Jobbins ....................... 106/778 |
| 6,228,163 B1 | 5/2001 | Espinoza et al. ........... 106/778 |
| 6,251,979 B1 | 6/2001 | Luongo ....................... 524/423 |
| 6,319,312 B1 | 11/2001 | Luongo ....................... 106/675 |
| 6,342,284 B1 | 1/2002 | Yu et al. ........................ 428/70 |
| 6,402,832 B1 | 6/2002 | Vijayendran et al. ....... 106/778 |
| 6,406,535 B1 | 6/2002 | Shintome .................... 106/705 |
| 6,406,779 B1 | 6/2002 | Carbo et al. ................ 428/219 |
| 6,461,512 B1 * | 10/2002 | Hirayama et al. .......... 210/636 |
| 6,485,821 B1 | 11/2002 | Bruce et al. ............ 428/304.4 |
| 6,492,450 B1 * | 12/2002 | Hsu ............................ 524/423 |
| 2002/0045684 A1 | 4/2002 | Bacher et al. .................. 524/4 |
| 2003/0084980 A1 | 5/2003 | Seufert et al. ................ 156/39 |
| 2003/0092784 A1 * | 5/2003 | Tagge et al. .................. 521/50 |
| 2003/0154888 A1 | 8/2003 | Yu et al. ..................... 106/772 |
| 2004/0045481 A1 | 3/2004 | Sethuraman et al. ........ 106/674 |

FOREIGN PATENT DOCUMENTS

| | | |
|---|---|---|
| DE | 3920025 | 1/1991 |
| EP | 0 216 297 | 4/1987 |
| EP | 0 486 467 | 5/1992 |

(Continued)

OTHER PUBLICATIONS

ASTM Standard Designation: C 473–95, pp. 249–259 (1995).

(Continued)

*Primary Examiner*—Morton Foelak
(74) *Attorney, Agent, or Firm*—Fowler White Boggs Hanker P.A.; Christopher J. Paradies

(57) ABSTRACT

A method and composition for polymer-reinforced composite cementitious construction materials is described. In one embodiment, a crosslinking component is mixed with a high molecular weight strengthening component and an inorganic cementitious material. The addition of the mixture to water causes a crosslinked molecular network to form within the hydrated, composite cementitious construction material. Both enhanced flexural strength and improved nail-pull resistance are shown, allowing a reduction in weight of the composite cementitious construction material compared to cementitious construction materials made according to other known methods.

50 Claims, 4 Drawing Sheets

FOREIGN PATENT DOCUMENTS

| | | |
|---|---|---|
| EP | 0 985 504 | 3/2000 |
| GB | 815184 | 6/1959 |
| GB | 2 022 503 | 12/1979 |
| GB | 2 048 235 | 12/1980 |
| JP | H02-267148 | 10/1990 |
| JP | H03-028181 | 2/1991 |
| WO | WO 99/54265 | 10/1990 |
| WO | WO 00/76937 | 12/2000 |
| WO | WO 01/34534 | 5/2001 |
| WO | WO 02/48254 | 6/2002 |
| WO | WO 02/083594 | 10/2002 |
| WO | WO 03/012218 | 2/2003 |

OTHER PUBLICATIONS

ASTM Standard Designation: C 36–95b, pp. 47–49 (1995).

ASTM Standard Designation: D3876–96, pp. 1–3 (2001).

The Dow Chemical Company, "Methocel Cellulose Ethers—Helping to Create Better Building Materials" (Oct. 1999).

The Dow Chemical Company, "Methocel Cellulose Ethers—For Crack Fillers and Tape–Joint Compounds" (Aug. 1999).

The Dow Chemical Company, Methocel Cellulose Ethers—For Cement–Based Plaster (Dec. 2000).

F. Brandt et al., "Bassanite ($CaSO_4 \cdot 0.5H_2O$) Dissolution and Gypsum ($CaSO_4 \cdot 2H_2O$) Precipitation in the Presence of Cellulose Ethers," Journal of Crystal Growth 233:837–845 (2001).

U. Ludwig et al., "Effect of Temperature and Methyl Cellulose on the Hydration of Gipsum β–Hemihydrate," Il Cemento, vol. 1, pp. 39–50 (1979).

S–I. Takahashi et al., "Relationship between Distribution of Substituents and Water Solubility of O–Methyl Cellulose," Journal of Polymer Science: Part A: Polymer Chemistry, 25:987–994 (1987).

F. Hayashi et al., "Polyurethane–Gypsum Foams," Int. Prog. Urethanes, 3:113–133 (1981).

The Dow Company, "Methocel Cellulose Ethers for Gypsum–Based Building Materials—The final touch for building materials" (Aug. 1999).

T. Michelsen, "Building Materials (Survey)," Encyclopedia of Chemical Technology, 4th Edition, pp. 618–619 (1992).

* cited by examiner

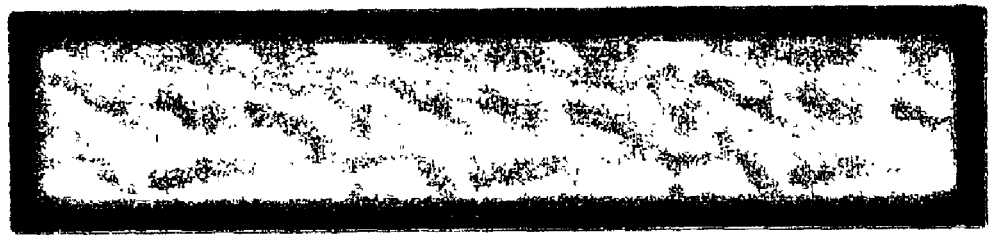
PVP
PVP + PSS
FIG. 1

METHOD AND COMPOSITION FOR POLYMER-REINFORCED COMPOSITE CEMENTITIOUS CONSTRUCTION MATERIAL

RELATED APPLICATIONS

This application is a continuation-in-part of U.S. application Ser. No. 10/094,572, filed Mar. 7, 2002 now U.S. Pat. No. 6,743,830, which claims the benefit of U.S. Provisional Application Ser. No. 60/273,925, filed Mar. 7, 2001.

FIELD OF THE INVENTION

The present invention relates to a method and composition for polymer-reinforced composite cementitious construction material, such as lightweight concrete, reinforced concrete, precast concrete, gypsum wallboards, reinforced gypsum composite boards, plasters, machinable cementitious materials, joint treatment compounds, and acoustical tiles, for example. The method and composition is also useful for lightweight and strong moldable cementitious products such as orthopedic plaster casts and dental models.

BACKGROUND OF THE INVENTION

Cementitious building materials, such as concrete and gypsum products, are typically prepared by mixing dehydrated inorganic material with water and casting the resulting slurry into molds, forms, or sheets where it hydrates, hardens, and dries. For example, the production of gypsum-containing articles involves combining calcined gypsum powder (calcium sulfate hemihydrate and/or calcium sulfate anhydrite) with water (and often a small percentage of a variety of additives), and casting the mixture into a desired shaped mold or onto a surface. The resulting hydration reaction produces an interlocking matrix of gypsum crystals (calcium sulfate dihydrate). This is often followed by mild heating to drive off the remaining free (unreacted) water to yield a dry product.

Cementitious materials are used universally, primarily in the construction industry, for their desirable qualities of ease of casting, high compressive strength, and fire-resistance. Cementitious products include concrete, lightweight concrete, reinforced concrete, concrete board, gypsum boards, reinforced gypsum composite boards, plasters, machinable materials, joint treatment materials, acoustical tiles, plaster casts, and dental models. The most notable shortcoming is the weight of the products produced using cementitious materials, which results in relatively high production, installation, and building costs. Since the strength of a given composition is proportional to its density, current cementitious building materials must have relatively high densities in order to achieve desired performance requirements. The density of the material, and thus the overall weight of the products, can be reduced by introducing air voids or expanded filler into the inorganic material but only with a loss in strength that is more than merely proportional to the weight loss.

All of the cementitious products described above would benefit from increased strength-to-weight ratio, which would make them more resistant to the stresses encountered during use while reducing weight and building costs. Wallboard, the largest volume gypsum product would particularly benefit from such an improvement. Wallboard typically consists of a gypsum core sandwiched between sheets of cover paper. In an effort to decrease the weight of the product, producers have steadily increased the porosity of the gypsum core by incorporating air voids or lightweight filler. The core is thus weak and the majority of current wallboard strength is provided by fiber-oriented, multi-ply cover paper. Paper is by far the most expensive component of wallboard manufacture, contributing more than 40% to the manufacturing cost. In addition, the paper facing of wallboard is subject to mold, which consumes the cellulosic material, deteriorates the mechanical integrity of the board, and produces foul smelling, toxic chemicals.

There is continuing effort to make gypsum-containing products lighter in weight by substituting lower density materials (e.g., expanded perlite or air voids) for part of their set gypsum matrix. In such compositions, there is a need to increase the strength of the set gypsum above normal levels in order to maintain overall product strength because there is less set gypsum mass to provide strength in the lower density product.

A number of additives, such as cellulosic particles and fibers, have been included to further improve the mechanical properties of cementitious products. More expensive glass fibers are used in place of wood in applications where high fire resistance is required. However, conventional fibers, particularly glass, do not adhere well to the gypsum matrix and decrease the workability of the gypsum slurry, thus limiting improvement of the board. Glass fibers are also brittle and can be easily dislodged during board handling, installation, or demolition to cause irritation of the skin or lungs.

More recently, there has been increasing interest in improving the strength and wear resistance of construction materials by incorporating synthetic polymers. Cementitious composites containing water-dispersible polymers having modest improvement in strength-to-weight have been found by adding latex or other strengthening polymers to the cementitious materials. However, several unique challenges have thus far restricted the commercialization of polymer reinforced cementitious products to relatively expensive niche products.

U.S. Pat. No. 6,402,832 ("the '832 Patent") describes the use of additives in quick-drying joint compound. In one example, a water soluble functional polymer with either a nitrogen or a sulfonate group, such as poly(vinyl pyrrolidone) ("PVP") at a molecular weight of between 20,000 and 40,000 (all molecular weights reported herein are in Daltons), was combined with a powdered solid bisphenol-A-based epoxy resin, such as Shell EPON™ 1002F ("Epoxy"), achieving a crack resistance strength slightly higher than PVP alone and a slightly faster drying time than PVP alone.

However, the PVP and Epoxy additives of the '832 Patent, either alone or together, decreased the porosity caused by evaporation of water from the slurry (the '832 Patent, column 4, ll. 46–54). According to the '832 Patent, the decrease in porosity of the joint compound was the primary mechanism in the increased crack resistance (the '832 Patent, column 1, ll. 50–59), which was based on the load required for crack initiation in the joint between two pieces of wallboard.

In other examples, the '832 Patent taught that a range of molecular weight of between 40,000 and 80,000 for PVP produced significantly improved crack resistance compared to higher molecular weight PVP (the '832 Patent, column 6, ll. 3–5). At this molecular weight, a concentration of between 3 wt % and 6 wt % of PVP with between 2 wt % and 4 wt % Epoxy was disclosed as an optimal, lowest range of concentration to achieve an optimally improved combination of both crack resistance and drying times (the '832 Patent, column 7, ll. 7–21).

The cost of polymers is typically hundreds of times that of the inorganic material, particularly for gypsum products, and additions of strengthening polymers normally are restricted to a small percentage of the mixture (e.g., less than 1% of weight of stucco for wallboard applications) to be successful commercially. However, because high strength polymers typically have a low adhesion to inorganic materials and tend to coagulate in aqueous solution, large amounts of polymer (or compatibilizers, such as surfactants) are needed to improve the strength to weight ratio of the composites.

Alternatively, hydrophilic polymers adhere well to gypsum crystals but tend to either: (1) have low intrinsic film strengths; (2) bind so well to gypsum crystals that hydration and crystal growth, and thus composite strength, are severely retarded; or (3) show a greater affinity to water than the inorganic material and migrate to the edges of the sample with the evaporating moisture leaving the core without reinforcement and weak.

In U.S. application Ser. No. 10/094,572, filed Mar. 7, 2002, ("the '572 Application") the specification of which is incorporated herein in its entirety, polymers overcoat the inorganic, filler particles, providing adhesion between the particles and cohesion (thus mechanical/dimensional stability) of the overall core composite. In addition to bridging the particles, the polymeric binder offers viscoelastic damping (thus acoustic energy absorption), leading to superior noise reduction. The overall system is lightweight and possesses fire/flame retardancy similar to conventional gypsum boards. Furthermore, the high insulation efficiency afforded by the large void fraction protects the framing structure (2"×4" studs) from becoming overheated in the event of an actual fire. The strengthening of the gypsum wallboard products made with the low-density cores of the '572 Application is primarily attributed to the strength of cover paper or other higher density layers formed at the surfaces of the wallboard, and the core itself is reduced in weight.

A longstanding need exists in the industry to substantially enhance the strength-to-weight ratio of cementitious materials, including cement and wallboard products, to produce lightweight products or stronger, wear resistant products. In addition, eliminating or reducing other additives, such as wallboard cover paper and glass fiber can reduce board and construction costs, environmental degradation and hazards to human health. Furthermore, a need exists to improve the thermal and sound insulation properties of high strength cementitious building materials.

SUMMARY OF THE INVENTION

One embodiment of the present invention is a method for production of a polymer-reinforced composite cementitious construction material. Another embodiment is a composition of matter comprising a polymer-reinforced composite cementitious construction material.

In one specific embodiment, hydration of calcined gypsum in the presence of a synergistic combination of strengthening component and a crosslinking component causes the set gypsum produced by such hydration to achieve a surprising and unexpected improvement in nail pull resistance, flexural strength and other properties, satisfying a longstanding and unresolved need for cost-effective, lightweight building materials.

In one embodiment of the method, the method produces a building material with a microstructural morphology of the composite cementitious construction material that provides superior material properties compared to known building materials, including flexural strength, nail-pull resistance, hardness, thermal/sound insulation, resistance to moisture/fungus/microbial deterioration, and reduced environmental impact on human health while reducing overall construction costs compared to other methods of producing building materials.

For example, the composition of matter of one embodiment of the present invention comprises an organic, water-dispersible polymer strengthening component and a crosslinking component that creates a molecularly crosslinked network that interpenetrates an inorganic cementitious matrix material. The inorganic matrix provides mechanical and dimensional stability as well as fire/flame retardancy. In specific embodiments, the strengthening and crosslinking components combine synergistically and are effective at very low concentration.

In alternative embodiments the formulation enhances gypsum hydration and crystal growth, contributing to superior adhesion between an inorganic cementitious material and a crosslinked organic strengthening component. It is believed by the inventors, without limiting the present invention in any way, that the superior adhesion results in a surprising and unexpected improvement in the strength-to-weight ratio of the composite material, because the crosslinking of the organic water-dispersible strengthening polymer causes gelation of the strengthening polymer, which prevents the migration of the strengthening polymer to the surfaces of the composite that, otherwise, has been observed to occur during drying. Therefore, an interpenetrating organic polymer network and inorganic matrix material imparts superior strength to the cementitious building materials compared to previously known methods. Thus, a reduction in weight and/or an increase in strength of products produced using the composition of matter are achieved.

In alternative embodiments, the cost of both of the strengthening and crosslinking components is more than offset by the reduction or removal of other strengthening agents. In one specific alternative embodiment, the number of layers and/or thickness of the paper facings can be reduced or eliminated. In another specific alternative embodiment, the weight of the composition of matter is reduced compared to known compositions of matter having the same strength, size and thickness by adding porosity (air voids), which significantly enhances the insulating properties (for example, both thermal insulation value and high-frequency sound attenuation) of the cementitious building material.

The polymer-reinforced composite cementitious construction materials of the present invention are ideally suited for use as lightweight building materials, including applications normally using concrete, high strength concrete, reinforced concrete, concrete board, wallboards, sheathing board, gypsum glass mat board, paperless wallboard, ceiling board, plasters, machinable cementitious materials, wallboard joint treatment materials, spackling or repair materials, and acoustical tiles. In addition, specific embodiments of the method are useful for preparing lightweight and/or high strength plaster casts and dental models, for example. Furthermore, decorative tiles, roofing tiles, plumbing fixtures, and countertops benefit from the high strength and/or lightweight polymer-reinforced composite cementitious construction materials of the present invention.

In yet another alternative embodiment of the present invention, the polymer-reinforced composite cementitious construction materials may be filled between any two surfaces, such as wood veneers and fiber reinforced polymer panels, to fabricate fire resistant, lightweight panels and other structures, for example doors. The low density and high strength of building materials made from polymer-reinforced composite cementitious construction materials of the present invention also synergistically reduce the costs of surrounding structures, the cost of shipping, and the time and labor required for installation, reducing overall construction costs compared to conventional, known building materials.

DESCRIPTION OF THE DRAWINGS

For the purpose of illustrating the invention, representative embodiments are shown in the accompanying figures, it being understood that the invention is not intended to be limited to the precise arrangements and instrumentalities shown. The data discussed in FIGS. 1–4 are derived from paperless samples.

FIG. 1 illustrates an iodine staining technique showing, by shading, the location of the strengthening component, PVP, in a cementitious composite, wherein the image labeled PVP used no crosslinking component and the image labeled PVP+PSS used poly(sodium 4-styrenesulfonate (PSS) as a crosslinking component.

DETAILED DESCRIPTION OF THE PREFERRED EMBODIMENTS

Figure 2:
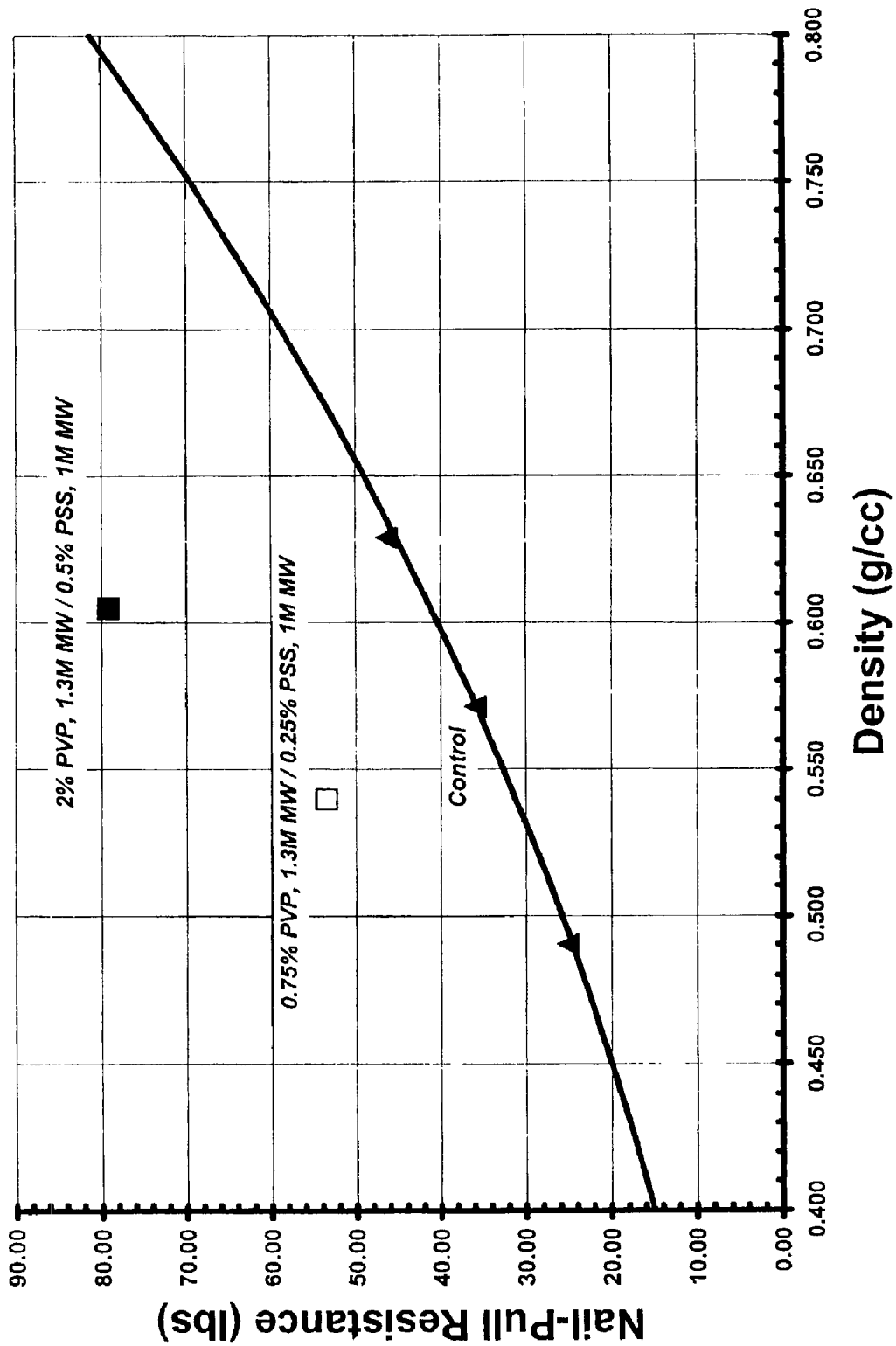
FIG. 2 shows the percentage improvement in nail pull resistance of several embodiments having PVP only (dashed line with circles), PSS only (dotted line with triangles) and PVP in combination with PSS at a molecular weight of 1 million (solid line with squares) as a function of the molecular weight of PVP (except for PSS only, which is a function of the molecular weight of the PSS).

The present invention will now be described in detail for specific embodiments of the invention. These embodiments are intended only as illustrative examples and the invention is not to be limited thereto.

In one embodiment, the polymer-reinforced composite cementitious construction material comprises a cementitious material, such as a gypsum or a cement, for example, and a polymer composition formed by combining a strengthening component and a crosslinking component. It is believed, without limiting the invention in any way, that the crosslinking component acts upon the strengthening component to crosslink the strengthening component in situ, causing a superior distribution of the strengthening component and establishing an intimate interaction between the strengthening component and the inorganic particles.

In one embodiment, small additions of strengthening polymers act synergistically with a crosslinking component, achieving a surprising and unexpected increase in the strength-to-weight of the polymer-reinforced composite cementitious construction material compared to conventional additions of polymers without the synergy of a crosslinking component. Furthermore, the inventors believe, without limiting the invention in any way, that high molecular weight components form an extended molecular network throughout the cementitious construction material, which significantly improves properties compared to the low molecular weight polymers used conventionally.

In one specific embodiment, the strengthening component is a water-dispersible nitrogenous polymer. For example, a water soluble and highly polar polymer provides for strong interaction between the strengthening component and the inorganic matrix particles, helping to bind particles and strengthening the composite cementitious construction material.

It is believed that the crosslinked polymer network also causes a change in the morphology of the calcium sulfate dihydrate crystals. Micrographs of the microstructure of the specimens of one embodiment revealed crystals that appeared both longer and thicker than the crystals in specimens prepared according to the known art. This effect is greatly influenced by the process chosen for mixing, hydration, forming, and drying of the resulting polymer-reinforced cementitious material.

In addition, it is believed that the crosslinked molecular network acts as a binder to promote adhesion between the crystals, enhancing the strength of the composite. The molecularly crosslinked polymer network does not coagulate, agglomerate, or migrate to the surface as shown in FIG. 1. Instead, it has a high affinity for the inorganic crystals, perhaps coating them with a fine layer. Therefore, strength is enhanced even at low polymer loading with reduced cost compared to known strengthening additions. Also, low polymer loading allows much higher molecular weight polymers to be used as the strengthening component without undesirably increasing the viscosity of the slurry that could otherwise lead to processing difficulties.

FIG. 1 shows that the addition of PSS, which acts as a crosslinking component to PVP, which acts as a strengthening component, substantially reduces the migration of the water-soluble PVP to the surface of the slurry that would otherwise occur during drying. Migration of water-dispersible polymers and additives such as starch and borax is well known in the art, as the evaporating water carries water-dispersible and water-soluble components to the surface during the drying process. Using a technique of iodine staining, FIG. 1 shows that without a crosslinking component, PVP migrates to the surface; however, very small additions of a crosslinking component, for example 1 part of PSS to 4 parts of PVP, substantially reduces migration of the strengthening component to the surface during drying.

Migration of the strengthening component to the surface of a specimen enriches the concentration of strengthening component in the facing layers, which experience the highest bending stress. This may lead to enhanced flexural strength, but leaves the core of the specimen devoid of the strengthening component. By preventing migration of the strengthening component, even small additions of a crosslinking component synergistically enhance the resistance of the material to the pull-out of nails. Poor nail pull resistance is a primary shortcoming of known reduced density cementitious building materials, such as lightweight wallboard. The low-density core of conventional reduced density cementitious building materials is weakened by migration of the strengthening component to the surface of the lightweight wallboard, and the low-density core tends to fail easily under a load, for example by crushing, densifying or deforming, leaving only the surface layers to resist pull-out of the nails. In contrast, in one embodiment of the present invention, a small addition of a crosslinking component, which reduces migration of the strengthening component to the surface during drying, greatly enhances the nail pull resistance of the core region. Therefore, the overall nail pull resistance of the wallboard is enhanced significantly compared to conventional lightweight wallboard.

Figure 4:
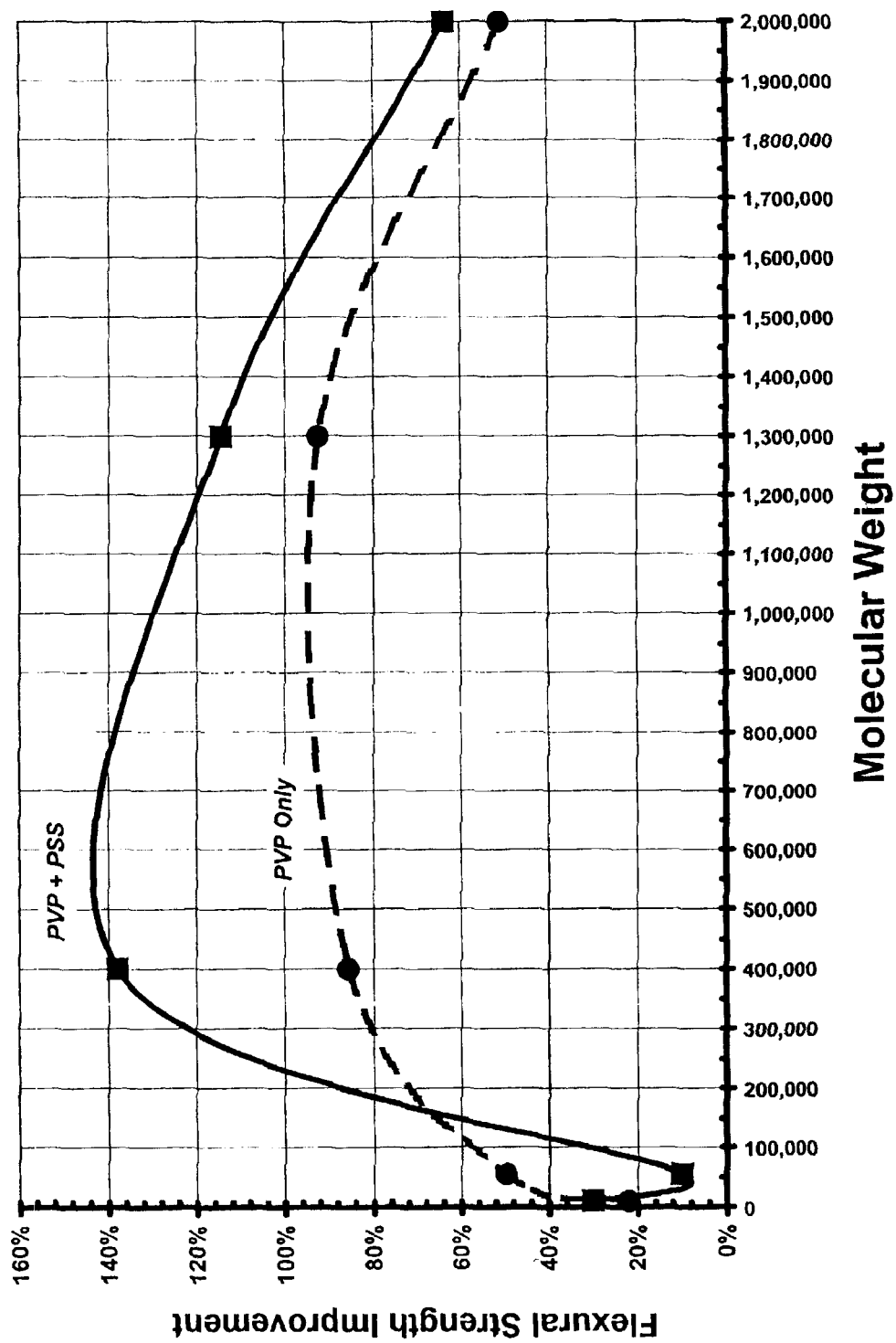
FIG. 4 shows the actual nail pull resistance load with respect to density of embodiments of the invention containing PVP in combination with PSS (squares), and the nail pull resistance as a function of density for control samples created without any strengthening or crosslinking components added (solid line with triangles).

The solid line in FIG. 4 shows the nail pull resistance (in lbs.) as a function of the density of unreinforced control specimens (in g/cc), which was calculated based on the experimental control specimens (black triangles) and known strength-density relationships. Points A and B illustrate that the current invention provides for a weight reduction greater than 20% for a nail pull resistance of 50 lbs.

In FIG. 2, the improvement in the nail pull resistance is the percentage improvement in the nail pull resistance of the strengthened composition that is normalized by dividing the measured nail pull resistance of a specimen by the nail pull resistance of an unreinforced specimen at the same density. The nail pull resistance of an unreinforced specimen at the same density is determined from the relationship between the nail pull resistance and density as shown by the solid line in FIG. 4. The improvement in the flexural strength of FIG. 3 was calculated using a similar method, using the known relationship for the flexural strength versus density of an unreinforced specimen to normalize the flexural strength data. Thus, a nail pull improvement of 0% in FIG. 2 reflects a nail pull resistance that is equal to that expected for a control specimen of the same density as the specimen tested, and a flexural strength improvement of 0% in FIG. 3 reflects a flexural strength that is equal to that of a control specimen with the same density. An improvement of 100% means that the value is twice the value expected for a control specimen of the same density as the specimen tested.

In one specific embodiment, the strengthening component comprises a vinyl pyrrolidone, wherein the vinyl pyrrolidone comprises homopolymers, copolymers or both homopolymers and copolymers. The strengthening component is used in combination with a crosslinking component that has the ability to crosslink the vinyl pyrrolidone. Results show a dramatic increase in the nail-pull resistance and flexural strength of the composite cementitious construction material compared to control specimens (for examples see Table 1 and FIGS. 2–4). As can be seen for the control specimens in FIG. 4 a decrease in the density of a specimen tends to cause a decrease in the flexural strength and nail-pull resistance of the specimen. This is as expected given the relationship between relative strengths and stiffnesses, and relative density, for example as shown in *Cellular Solids Structure and Properties*, 2d Ed., L. Gibson and M. Ashby, Cambridge University Press, New York (1997) pp. 192–198. This tendency is overcome in some specific embodiments according to the present invention.

FIG. 2 shows that the addition of one specific crosslinking component (PSS), by itself, decreases the value of the nail pull resistance. However, the combination of one or more specific strengthening components with one or more specific crosslinking components in a method according to an embodiment of the present invention has a surprising and unexpected synergistic effect on the strength-to-weight of the composite cementitious construction material, which is reflected in FIGS. 2–4. Specifically, FIG. 2 shows a synergistic nail pull resistance improvement by combining PVP with PSS as a crosslinking component.

The nail pull resistance is a key mechanical property for wallboard. The typical way of fastening wallboard to studs is to insert a nail or screw through the wallboard and into a supporting stud within a wall. Lightweight wallboard has difficulty meeting the standards for nail-pull resistance especially if the core density is reduced by adding porosity. By using a water-dispersible strengthening component in combination with a crosslinking component as additives to gypsum wallboard, embodiments of the present invention meet or exceed the nail-pull resistance standards at substantially reduced weight for a standard size wallboard, which solves a longstanding and unresolved need.

Figure 3:
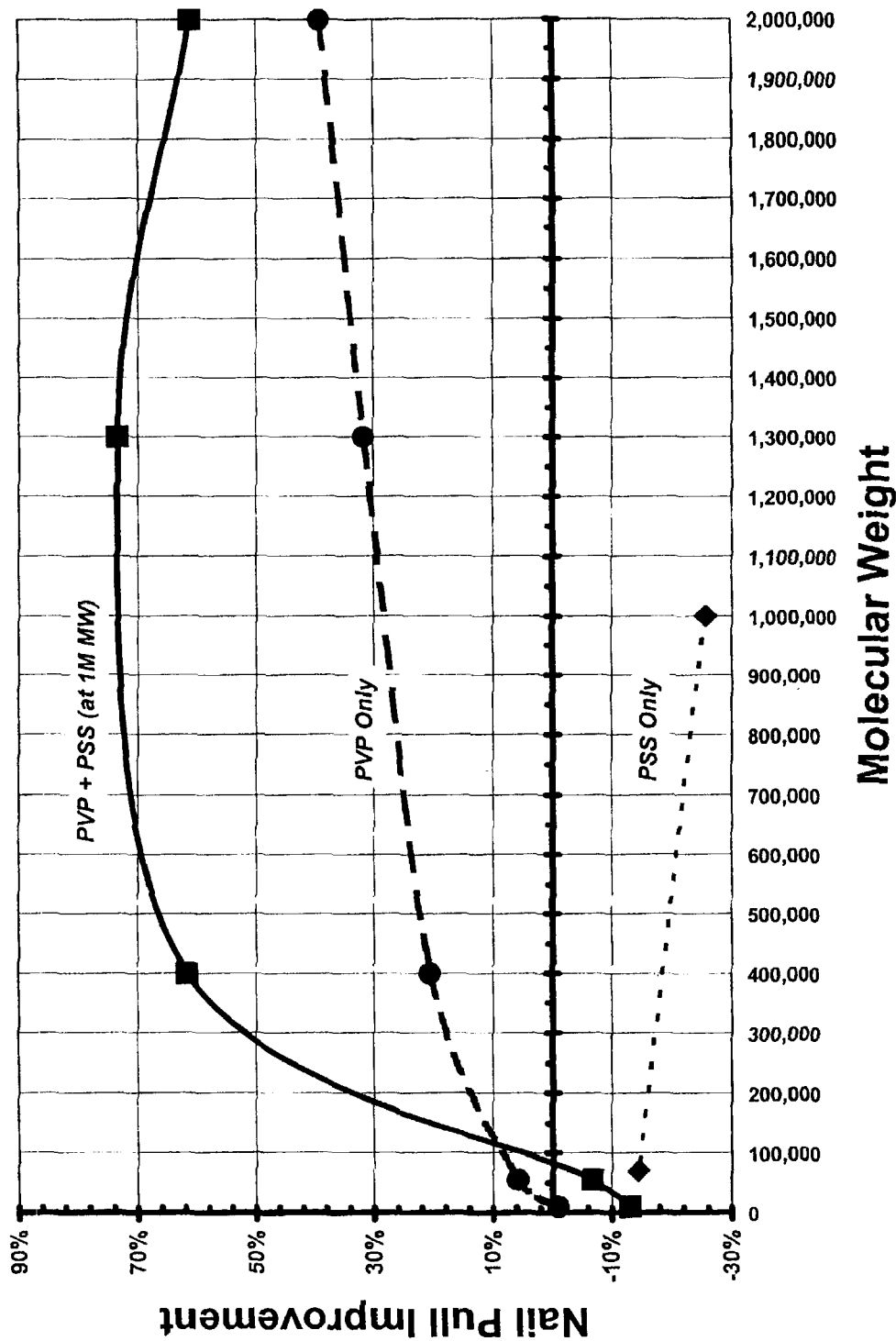
FIG. 3 shows the normalized flexural strength of several embodiments having PVP only (dashed line with circles) and PVP in combination with PSS (solid line with squares) as a function of the molecular weight of PVP.

Increasing the molecular weight of the strengthening component modestly strengthens the composite even in the absence of a crosslinking component as shown in FIGS. 2 and 3. For example, PVP was added at a concentration of 2 g per 100 g of inorganic cementitious powder, as shown in Table 1. In this case, PVP modestly enhanced the nail pull resistance and flexural strength of the composite. Adding a crosslinking component has a synergistic effect that exceeds the effect of merely adding more of the strengthening component for PVP having molecular weights greater than about 100,000. This surprising result solves the longstanding problem of cost effectively enhancing the strength to weight of cementitious building materials, by permitting the use of small additions, for example only 1% or less, of a strengthening component in a lightweight product that meets or exceeds standards used in the construction industry, even if only very small amounts of a high molecular weight crosslinking component is added to crosslink the PVP.

Indeed, the nail pull resistance of a composite with PVP as a strengthening component and PSS as a crosslinking component (at lower polymer loading than the specimens containing PVP alone), greatly exceeds that with PVP alone (no crosslinking component) as shown in the results of Table 1 and FIGS. 2 and 3. FIG. 2 shows that the nail pull resistance of composites of the invention is substantially improved for molecular weights of PVP that are about 100,000 or greater. Herein, substantially improved is used to define an improvement in nail pull resistance of at least about 10%. The term "about 100,000" is used to indicate that differing processing parameters and selection of differing strengthening and crosslinking components cause the value of the molecular weight that causes substantially improved nail pull resistance to vary. The normalized flexural strength also increases at molecular weights greater than 100,000. Therefore, a high-molecular-weight strengthening component is defined as one that has a molecular weight of at least about 100,000.

Substantially improved nail pull resistance begins at a molecular weight of 80,000 for some compositions. Others require a molecular weight of 120,000 before achieving a substantial improvement in nail pull resistance. Therefore, the term "about 100,000" is meant to encompass variations of plus or minus 20%, depending on variations in manufacturing tolerances caused, for example, by specific processing conditions or specific compositions of the strengthening components and crosslinking components. Preferably, the strengthening component has a molecular weight of at least about 100,000. More preferably, the strengthening component has a molecular weight of at least 100,000 but no greater than 1.3 million. The results in FIGS. 2 and 3 show that above 1.3 million, increasing molecular weight no longer increases the nail pull resistance and decreases the improvement in flexural strength.

Specific examples of a strengthening component include a vinyl pyrrolidone including, but not limited to, poly(vinyl pyrrolidone), poly(vinyl pyrrolidone-co-vinyl caprolactam), poly(vinyl pyrrolidone-co-diethylaminoacrylate), poly (vinyl pyrrolidone-co-vinyl acetate), poly(vinyl pyrrolidone-co-styrene), poly(vinyl pyrrolidone-co-imidazole), poly(vinyl pyrrolidone-co-vinyl caprolactam-co-diethylaminoacrylate), poly(vinyl pyrrolidone-co-vinyl caprolactam-co-vinyl acetate), and mixtures thereof.

The inventors believe, without being limited thereto, that a high molecular weight strengthening component is desirable, because the gel that forms by adding a crosslinking component binds the strengthening component and prevents its migration to the surface of the composition of matter during drying by evaporation of water. The inventors believe that an embodiment of the present invention forms a crosslinked molecular network co-continuous with the inorganic matrix phase.

For example, the crosslinking component may bind the strengthening component through ionic interactions, hydrogen bonding, covalent bonding, or physical interactions, and combinations thereof. In one specific preferred embodiment the inventors believe that the crosslinking component binds the strengthening component with ionic bonding, hydrogen bonding or both ionic and hydrogen binding.

In one specific embodiment, the crosslinking component is a substance different than the strengthening component, for example a polymer that is different than the strengthening component. In an alternative embodiment, the strengthening and crosslinking components are regions within the same polymer macromolecule, such as a block or random copolymer containing pendant groups capable of pendant ionic or hydrogen bonding that interact with one another to form a crosslinked network.

In yet another embodiment, the crosslinking component is a catalyst that initiates the formation of covalent bonds between polymer chains of the strengthening component forming a crosslinked network.

In an alternative embodiment, the inventors believe, without restricting the invention thereto, that the crosslinking component has a physical, rather than specific chemical interaction, with the strengthening component. For example, the crosslinking component comprises additives that form a gel in water, which physically restricts the migration of the strengthening component and/or aids in physically tangling the polymer chains of the strengthening component.

In alternative embodiments, combinations of other high molecular weight, water-dispersible nitrogenous homopolymers, copolymers and combinations of homopolymers and copolymers have been found to enhance the strength-to-weight ratio of the composite cementitious construction material, when synergistically combined with a crosslinking component compared to control specimens and specimens adding water-dispersible strengthening component in the absence of a crosslinking component. Although experimental results are too numerous to list herein, some specific examples of alternative embodiments include, but are not limited to, polyacrylamide, poly(acrylamide-2-methyl-1-propane sulfonic acid), poly(vinyl caprolactam), poly(2-ethyl-2-oxazoline), poly(vinyl pyridine), poly(vinyl imidazole), acrylamide copolymers, 2-ethyl-2-oxazoline copolymers, vinyl caprolactam copolymers, vinyl pyridine copolymers, vinyl imidazole copolymers, and mixtures thereof. These specific embodiments also tend to show a synergistic effect at high molecular weight of the strengthening component with a component that acts to crosslink the strengthening component, whether by physical or chemical crosslinkage.

Some examples of ionic crosslinking components include polysulfonates, polycarboxylates, and polyphosphates. For example, polysulfonates are preferred when used with some specific strengthening components. Examples of polysulfonates include metal (e.g., alkali and alkaline earth cations) and ammonium salts of poly(styrene sulfonic acid), poly (vinyl sulfonic acid), poly(2-acrylamido-2-methyl-1-propanesulfonic acid), naphthalene sulfonate condensates, melamine sulfate condensates, lignin sulfonate, and copolymers containing salts of styrene sulfonic acid, vinyl sulfonic acid, propane sulfonic acid, and 2-acrylamido-2-methyl-1-propanesulfonic acid, and mixtures thereof. Other ionomers were also found to act synergistically with strengthening components include polyphosphates, such as ammonium polyphosphate, polyphosphonates, and polycarboxylates, such as salts of copolymers of acrylic acid.

The improvement in strength to weight may depend not only on the choice of the particular crosslinking component, but also may depend on the molecular weight of the crosslinking component, especially if the crosslinking component is an ionic crosslinking component. For example, the effect of PSS used in combination with PVP having a molecular weight of about 1.3 million, on the strength-to-weight ratios of gypsum composites increases steadily with molecular weight. PSS with a high molecular weight, of at least 70,000, more preferably at least about 100,000, and even more preferably about 1,000,000, is used in specific embodiments of the invention (where "about" continues to mean plus or minus 20%).

In specific examples of alternative embodiments, polymers with pendant groups suitable for hydrogen bonding interactions with PVP show increased strength to weight, including, but not limited to, poly(vinyl alcohol), poly (acrylic acid), copolymers of acrylic acid, copolymers of methacrylic acid, copolymers of styrene sulfonic acid, copolymers containing salts of styrene sulfonic acid, copolymers of acrylamido-2-methyl-1-propane-sulfonic acid, and copolymers and mixtures thereof.

The molecular weight threshold for improved strength-to-weight ratio varies depending on the structure of the crosslinking component and optimal ranges must be independently determined. The increase in strength-to-weight ratio attributed to the crosslinking component may depend on molecular weight. For example, commonly used dispersants for use in the manufacture of wallboard such as Daxad (naphthalene sulfonate condensate; MW=7,000 to 10,000) and lignin sulfonate (MW=10,000 to 20,000) have little or no synergistic effect when used in combination with PVP, even if the PVP has a high molecular weight. In some instances, an organic crosslinking component with a molecular weight of about 50,000 or greater is sufficient, depending on processing conditions, molecular weight of at least about 100,000 being more preferred in general. More preferably, an organic, ionic crosslinking agent with a molecular weight of at least 70,000 may be selected.

In specific examples of alternative embodiments, the strengthening component and crosslinking component are different regions within the same polymer macromolecule including, but not limited to, random or block copolymers of vinyl pyrrolidone and styrene sulfonate, random or block copolymers of vinyl caprolactam and vinyl sulfonate, random or block copolymers of vinyl pyridine and acrylamido-2-methylpropane sulfonic acid), random or block copolymers of acrylamide and acrylic acid (or its salts), and mixtures thereof.

In one specific embodiment, the high molecular weight strengthening component is self-crosslinked in water using a catalytic crosslinking component. In this case, the molecular weight of the catalytic crosslinking component is not critical, because the high molecular weight strengthening component is self-crosslinked. As one example of a method of manufacture, a strengthening component, poly(vinyl pyrrolidone), is heated with a combination of aqueous hydrogen peroxide and copper(II) chloride (the combination being the crosslinking component) to covalently crosslink PVP into a gel, which is then immediately combined with an inorganic cementitious material, such as gypsum. In an alternative embodiment, the crosslinking reaction is conducted by heating after mixing together the inorganic cementitious material, the strengthening component, and the crosslinking component. In each case the desired strengthening is observed.

In contrast, the addition of commercially available lightly cross-linked poly(vinyl pyrrolidone) (PVPP), which is provided as a powder that is insoluble in water, to a gypsum slurry negatively affects the strength of the resulting composite. The inventors believe without being limited thereto, that some embodiments of the present invention create a crosslinked molecular network of PVP co-continous with the inorganic matrix phase by diffusion or migration of the PVP molecules, molecular crosslinking, and/or gypsum crystal growth, but PVPP is insoluble particulate matter, with little affinity for inorganic materials typically used in construction. Therefore, PVPP does not form a crosslinked molecular network co-continuous with the inorganic material.

In one preferred embodiment, a mixture comprising the strengthening component, the crosslinking component and the inorganic material are mixed together prior to adding water to the mixture, which forms an inorganic matrix interpenetrated by a polymeric network that dramatically improves the strength to weight ratio upon drying of the polymer-reinforced cementitious composite construction material.

In an alternative embodiment, the individual components and inorganic material were mixed with water individually. For example, the enhancing polymer and cross-linking agent can be dissolved individually at low concentrations in separate solutions with slightly elevated viscosities. In a specific embodiment, these two solutions were then combined, forming a gel of a much higher viscosity than the individual solutions at the same concentration. The inorganic material, for example a calcined mineral such as calcium sulfate hemi-hydrate (stucco), is then added to the gelled solution to form a slurry. At increased polymer concentrations, the slurry separates into an aqueous phase and a slurry phase of stucco and polymer gel, which demonstrates the positive interaction between the hydrating inorganic material and the cross-linked polymeric network.

In another embodiment, the inorganic material is added to the strengthening component and water to form a slurry prior to mixing with the crosslinking component. The crosslinking component is either added dry to the slurry or premixed with water. Alternatively, the crosslinking component can be a liquid component.

In yet another embodiment, the inorganic material is added to the crosslinking component and water to form a slurry, and then the strengthening component is added to the slurry in either a dry or liquid form.

As yet another alternative, the chemical reaction that causes the crosslinking component to react with the strengthening component is temperature sensitive, and the reaction occurs within a preferred temperature range.

Specimens were cast and mechanically tested to compare the flexural strength and nail-pull resistance of various specific embodiments of the present invention to various control specimens, for example containing no additives other than set accelerator, and to comparative samples containing sodium trimetaphosphate (STMP), a commercially available enhancing material for resistance to permanent deformation. STMP is used primarily for improving sag resistance. STMP has been shown to improve nail pull resistance by about 15%, but it adversely affects flexural strength. For these test purposes, beta calcium sulfate hemi-hydrate (stucco) and finely ground calcium sulfate dihydrate set accelerator were used. PVP and vinyl pyrrolidone copolymers were obtained from Aldrich Chemical Co., BASF corp., and ISP corp. PSS was obtained from Alco Chemical Co. and Aldrich Chemical Co. Sodium trimetaphosphate (STMP) was obtained from Aldrich Chemical Co. Daxad (naphthalene sulfonate condensate, MW=7,000–10,000) was obtained from Dow Chemical Co. Lignin sulfonate (MW=10,000–20,000) was obtained from Borregaard Chemical Co.

The order of adding the various components is not thought to be critical to the success of the method, but may limit the processing time and equipment that can be used to perform the various processing steps, which may affect the cost and/or quality of the the polymer-reinforced composite material produced according to the specific processing steps chosen. Nevertheless, the mechanical behavior of the specimens created by combining a high molecular weight strengthening component, a crosslinking component, an inorganic cementitious material and water was similar so long as the materials were well mixed and allowed to set while still in the form of a slurry. The inventors believe, without being limited thereto, that the process should allow sufficient time for the forming of a crosslinked molecular network that is co-continuous with the inorganic matrix phase. For example, the slurry should be allowed to set before the end of a chemical reaction causing chemical crosslinking, but after the chemical crosslinking has proceeded to bind the strengthening agent enough to reduce migration during drying.

In a specific embodiment of the method used to produce test specimens, samples were cast by dry mixing 150 g of stucco and 0.2 g of set accelerator with a strengthening component, such as PVP, and a crosslinking component, for example PSS. Then, for example, the resulting dry powder mixture was added at room temperature, to a 500 milliliter Waring blender containing a sufficient amount of water, for example tap water, to obtain the desired water to plaster ratio. The water to plaster ratio affects the density of the specimens. Alternatively, liquid additions or additions in solution were first mixed with the water prior to dry ingredients being added to the water, for example a liquid or solution crosslinking component may be added to the water prior to adding the remaining premixed dry powder mixture.

Then, optionally, the stucco mixture was allowed to soak, for example for several seconds, before blending. In one specific embodiment blending occurred at the low speed setting of the Waring blender. Comparable results were obtained when using the high speed setting. Alternatively, it may be desirable to introduce air into the mixture or to produce frothing by rapid stirring, for example, to reduce the density of the final product. The low speed setting of the Waring blender caused some frothing and reduced density, regardless of the ratio of water to inorganic material (WR) and regardless of the amount of strengthening component and crosslinking component added to the mixture. The bulk of any density change between specimens prepared with a lower ratio of water to inorganic materials and with an increased ratio of water to inorganic material was as a result of increased evaporation of water from specimens with an increased ratio of water to inorganic material. In this specific embodiment, the blending at low speed was continued for 15 to 25 seconds; however, the length of blending depends on the size of the batch, the type of process used for blending, and the viscosity. Generally, blending should be continued until the slurry is well mixed but not so long that the gypsum begins to set.

Also, the blending container was optionally hand shaken about halfway through blending to ensure even mixing throughout the container. Following blending, the resulting slurry was cast into a rectangular mold approximately 2 in×7 in×0.5 in. After the composition hardened (for example 15–30 minutes), the sample was removed from the mold and dried in a convection oven at 40° C. until dry, for example until the sample remained at a constant weight for a predetermined time, for example one hour. Typically, a sample the size of the one prepared by this specific embodiment requires at least 24 hours at 40° C. to completely dry. Drying time depends on the constituent components and additives and would be significantly decreased using higher temperatures and/or multizone ovens.

Then, the samples were cut into two inch by five inch rectangular test specimens and accurately dimensioned and weighed to determine density. The test specimens were mechanically tested on an Instron model 4466 bench-top mechanical testing system equipped with data acquisition software. Both three-point-bend flexural strength and nail-pull resistance were determined for each specimen.

The flexural strength measurements were conducted in a fashion similar to the flexural strength test described in ASTM C473, method B. The support span was decreased to four inches to accommodate the sample size with the standard size support radius of 0.125". The loading rate was decreased to from 1 to 0.1 inch/minute to attain more accurate readings due to the stiffness of the gypsum samples.

The nail-pull resistance of the specimens was determined for specimen halves remaining from flexural strength testing in a manner similar to the nail pull resistance test of ASTM C473, method B. The nail was machined according to the size and shape standards specified in ASTM C473. The specimen support plate hole diameter was decreased from 3 to 1.375 inches to accommodate specimen size. The resulting densities and mechanical strength values were catalogued along with the composition of the sample formulation. Power functions constructed from control data were used to normalize experimental data to provide a quick comparison amongst samples of differing densities and the results are reported in Table 1.

The synergistic interaction between strengthening and crosslinking components dramatically improves the strength-to-weight ratio of cementitious composites with very low additions of polymers. Also, the low weight percent of polymer additions keeps the viscosity of the slurry within acceptable parameters for production of polymer-reinforced composite cementitious construction materials.

For example, one embodiment is particularly applicable for the production of gypsum products, such as wallboard, because the core density can be reduced 25% by increased inclusion of air voids (porosity) without sacrificing wallboard strength while only adding modestly to the cost of the materials.

In an alternative embodiment, the wallboard product produced according to one embodiment of a method of producing a polymer-reinforced cementitious wallboard maintained strength and weight of standard wallboard without a paper facing. Yet another embodiment replaced the multi-ply paper reinforcement on each surface with a segregated polymer skim layer without loss of strength or increase in weight compared to standard wallboard. The elimination of the paper in these methods increase the resistance of the wallboard to deterioration while simultaneously reducing the cost of production. Variations of this method are disclosed in the '572 Application, which is incorporated herein, in its entirety, by reference.

These and other embodiments having improved strength-to-weight ratio provide for a lighter construction material, allowing easier installation, reducing shipping costs, which are a significant portion of wallboard costs, and/or eliminating other strengthening additives that have negative environmental impact, such as frangible fibers, dust, and cover paper, which is subject to mold that causes deterioration of the wallboard and may be toxic to some people.

Furthermore, high molecular weight ionomers may provide excellent paper bond and foaming properties.

Addition of 2 g of either low molecular weight PVP or PSS alone (not in combination) to 100 g of stucco reduces the density, for example due to air void incorporation, but also reduces the nail pull resistance of test specimens 4–10, regardless of the molecular weight of PSS and for low molecular weight PVP additions (where low molecular weight is defined as less than about 100,000). Only a modest improvement in normalized nail pull resistance was found for high molecular weight PVP additions (where high molecular weight is defined as about 100,000 or greater).

The results, for example in Table 1, show that high molecular weight PVP additions significantly increase the flexural strength compared to control samples with no PVP, and low molecular weight PVP additions decrease the flexural strength. The addition of only a crosslinking component (not in combination with a strengthening component), for example, PSS, either reduced or caused merely a slight increase. FIGS. 2 and 3 show that the synergistic combination of high molecular weight PVP and PSS enhances the nail pull resistance and flexural strength to a greater extent than one would expect based on the individual effects of high molecular weight PVP and PSS alone (not in combination). In alternative embodiments, a high molecular weight crosslinking component in combination with a strengthening component also having high molecular weight improves both the flexural strength and the nail-pull resistance and/or allows for weight reduction of the composite, cementitious building material compared to unreinforced materials, materials with only a strengthening component or a crosslinking component (not in combination), and materials with a low molecular weight strengthening component in combination with a crosslinking component.

In one preferred embodiment, a molecular weight of PVP of about 400,000 is combined with PSS at a molecular weight of about 70,000 to achieve excellent nail pull resistance and flexural strength, which synergistically exceeds the additive effect that would be expected from results of experiments testing PVP and PSS separately.

In embodiments shown in Table 1 as items 27 an 28, the addition of only 1 g of a combined strengthening component (0.75 g at a high molecular weight) and crosslinking component (0.25 g at high molecular weight) per 100 g of stucco increases both the flexural strength and the nail pull resistance of composites having about the same weight as the customary commercial board weight (1700 lb/1000 ft$^2$).

In another embodiment, the addition of only 1 g of a combination strengthening component and crosslinking component per 100 g of stucco allows the reduction of board weight by more than 25% (to 1250 lb/1000 ft2) compared to customary commercial board weight (1700 lb/1000 ft$^2$) with no loss in the flexural strength or the nail pull resistance.

In yet another embodiment, for example item 13 in Table 1, the addition of only 2.5 g of a combination of strengthening component (2 g at high molecular weight) and crosslinking component (0.5 g at high molecular weight) per 100 g of stucco produces a paperless composite wallboard having a density equivalent to a board weight of about 1600 lb/1000 ft$^2$ which exhibits about the same flexural strength and nail pull resistance of current commercial, multi-ply paper-faced wallboard. Herein the term about is used to suggest that the values determined for board weight, flexural strength and nail pulling resistance are subject to variability, for example based on sources and quality of raw materials, milling, stirring, and other processing variations and manufacturing tolerances, as is known to one of ordinary skill in the art of manufacturing wallboard and other building materials.

Furthermore, comparative specimens in Table 1 clearly demonstrate the surprising and unexpected increase in flexural strength and nail pull resistance of the embodiments combining a strengthening component at high molecular weight with a crosslinking component at a high molecular weight compared to the control specimens and specimens without such synergistic combination.

One embodiment of a composition of matter according to the present invention comprises a network of an organic strengthening component and an organic crosslinking component in a hydrated, inorganic cementitious material. In one specific embodiment, the inorganic cementitious material is calcium sulfate hemihydrate. In an alternative embodiment the inorganic cementitious material is calcium sulfate anhydrite. In another specific embodiment, the organic strengthening component is PVP, and the organic crosslinking component is selected to chemically or physically crosslink the PVP. For example, in one specific embodiment the organic crosslinking component is PSS.

One embodiment of a cementitious building material according to the present invention comprises a composition of matter including a network of an organic strengthening component and an organic crosslinking component in a hydrated, inorganic cementitious material in the form of a sheet, for example a flat sheet. In one specific embodiment, the cementitious building material is wallboard, and in an alternative embodiment the wallboard further comprises at least one layer of paper applied to at least one surface of the sheet. In another alternative embodiment, the wallboard further comprises an additive that segregates to a stratified layer on at least one surface of the sheet.

One embodiment of a composite wallboard comprises a stratified structure having a thin skim layer of a high density gypsum with a high proportion of PVP/PSS on the surface of a foamed gypsum core containing a low proportion of PVP/PSS. The resulting composite thus maximizes the advantages of PVP/PSS for flexural strength and paper bond, while minimizing cost.

Another embodiment of a composite wallboard comprises a skim layer that has a proportion of a surface modifying additive, for example a polyurethane dispersion, that is either not present in the core or is present in the core at a lower concentration than at the surface. This surface modifying addition, for example a polymer addition, may be present as a stratified layer that segregates to the surface of the slurry during processing and drying of the composite wallboard. In one embodiment, the surface modifying addition has a lower concentration in the PVP/PSS reinforced core of the material, such that the concentration at the surface is higher than the concentration of PVP/PSS at the surface, but the concentration in the core is less than the concentration of PVP/PSS in the core.

For example, such a stratified structure may impart a high mechanical strength to the wallboard and/or to the surface of the wallboard, allowing the composite wallboard to meet standards for building construction with no paper added to the surface of the wallboard. Alternatively, the stratified structure may reduce the number of paper plies required to meet the nail pull resistance and flexural strength standards for building construction or may improve the paint absorption properties of the wallboard. For example, the composite wallboard may then be paperless or covered with a single-ply paper facing for decorative purposes.

Another embodiment of a composition of matter comprising a surface layer including a high concentration of fibers, for example glass, wood, or cellulose fibers, that sandwiches a PVP/PSS reinforced core is suitable for sheathing board applications and/or applications requiring high impact strength.

In another alternative embodiment, a gradient structure is obtained through modification of the relative ratio of PVP to PSS and/or the molecular weight of the PVP component. By using a higher ratio of PVP to PSS, only a fraction of the PVP interacts with the PSS to form a gel. The remainder of the PVP tends to migrate towards the surface of the material carried by the evaporating water. The result is a composite that has a reinforced core, with a higher percentage of PVP near the drying surfaces of the composite structure.

In one specific embodiment, a small amount of strengthening component, wherein a small amount is defined as a mass less than 2% of the mass of the inorganic cementitious material, is combined with a trace amount of a crosslinking component, wherein a trace amount is as little as 1% of the mass of the strengthening agent. In this specific embodiment, a facing layer having a comparatively high concentration of the strengthening component is present at the drying surfaces of the composite structure (compared to the concentration in the core).

In an alternative embodiment, a highly active crosslinking component, for example a catalytic crosslinking component, could be used with a high molecular weight, water-soluble strengthening component even at a trace amount to form a composite structure with a comparatively uniform concentration of the strengthening component throughout the composite structure. It is possible for one of ordinary skill to predict the activity of the crosslinking component by empirical trial and error or by calculating the reaction rates and the extent of the reaction that leads to a crosslinked network. Therefore, the amount of strengthening component available for diffusion to the surface may be quantified for preparation of a specific embodiment of a structural composite. Furthermore, the reaction between the catalytic crosslinking component and the strengthening component can be delayed, for example by using a temperature sensitive catalytic crosslinking component or by using a commercially available retardant.

In another specific embodiment, the amount of the strengthening component is about the same as the amount of the crosslinking component, whereby the crosslinking component and the strengthening component are both present as crosslinked chains in a polymeric network with the inorganic cementitious material.

In alternative embodiments, the amount of the strengthening component and the amount of the crosslinking component may be selected with a ratio of between 100:1 to 1:10. For physical crosslinkages the ratio is more preferably between 10:1 and 1:2. For chemically crosslinked networks a range of between 5:1 and 1:1 has shown good results.

Nevertheless, the invention is not limited to any specific ratio of strengthening component to crosslinking component, because the preferred ratio depends on the choice of strengthening component, crosslinking component, and the type of crosslinking achieved. Indeed, a broad range of strengthening components and crosslinking components can be used to produce a gel that creates a crosslinked polymer network with long, crosslinked polymer chains, which the inventors believe creates the synergistic strengthening mechanism described and claimed herein.

The present invention is compatible with all common additives to cementitious products including inorganic fillers (such as perlite, expanded perlite, mica, clay, vermiculite), wood or glass fibers, starch, sodium trimetaphosphate, surfactants, foaming agents, borates (such as boric acid and sodium borate), and asphalt. In addition, while low molecular weight ionomers (e.g. Daxad) arc not suitable crosslinking components, it may be desirable to also include a minor portion of lower molecular weight ionomers with the present invention to perform a different function, such as a dispersant or water reducer.

The invention may also be used in combination with other additives to improve moisture resistance or to further enhance the strength or crack resistance of the composite. Examples include wax emulsions, poly(vinyl acetate emulsions), poly(vinyl alcohol)/borate crosslinked systems, poly(vinyl acetate)/borate crosslinked systems, acrylate emulsions, polyurethane emulsions, epoxies, and melamine.

The invention may also be used in combination with monomers or oligomers that can then be further reacted in situ. In this embodiment, the network formed by the strengthening and crosslinking components serves to confine added monomers or oligomers within the core of the sample preventing migration. The monomer or oligomer is then post-polymerized or chain-extended to provide a further reinforced network. For example, an epoxy dispersion and polyamine curing agent are added in combination with poly(vinyl pyrrolidone) and sodium poly(styrene sulfonate) to the gypsum slurry. The gelation of the strengthening and crosslinking components constrains the epoxy and curing agent to the core of the sample. The epoxy then cures after water has evaporated to give a further reinforced composite.

Additional variations and permutations, including mixing and processing steps, choice of strengthening and crosslinking components, and use of conventional additives are within the knowledge of one of ordinary skill in the art and fall within the scope of the present invention.

What is claimed is:

1. A wallboard for use in construction comprising:
   an organic strengthening component, having a high molecular weight;
   a crosslinking component; and
   a hydrated, inorganic cementitious material, wherein the organic strengthening component is crosslinked by the crosslinking component forming a crosslinked molecular network with the hydrated, inorganic cementitious material such that the nail pull resistance of the wall board is substantially improved compared to a wall board of the same density without the addition of an organic strengthening component crosslinked by a crosslinking component.

2. The wallboard of claim 1, wherein the strengthening component adheres to the hydrated, inorganic cementitious material.

3. The wallboard of claim 1, wherein the organic strengthening component and the crosslinking component are portions of the same macromolecules and crosslinking occurs in situ after the organic strengthening component and crosslinking component are mixed with the hydrate, inorganic cementitious material such that a crosslinked molecular network is formed with the hydrated, inorganic cementitious material.

4. The wallboard of claim 3, wherein the macromolecules are selected from the group of macromolecules consisting of copolymers of vinyl pyrrolidone and styrene sulfonate, copolymers of vinyl caprolactam and vinyl sulfonate, copolymers of vinyl-pyridine and acrylamido-2-methylpropane sulfonic acid, copolymers of acrylamide and an acrylic acid, and mixtures thereof.

5. The wallboard of claim 1, wherein the organic strengthening component is selected from an organic strengthening component consisting of a polyacrylamide, .poly (acrylamide-2-methyl-1-propane sulfonic acid), poly(vinyl caprolactam), poly(2-ethyl-2-oxazoline), poly(vinyl pyridine), poly(vinyl imidazole), an acrylamide copolymer, a 2-ethyl-2-oxazoline copolymer, a vinyl caprolactam copolymer, a vinyl pyridine copolymer, a vinyl imidazole copolymer, and combinations thereof.

6. The wallboard of claim 1, wherein the organic strengthening component is PVP with a molecular weight of at least about 100,000.

7. The wallboard of claim 6, wherein the organic crosslinking component is selected to crosslink the PVP.

8. The wallboard of claim 7, wherein the organic crosslinking component has a molecular weight of at least about 100,000.

9. The wallboard of claim 7, wherein the organic crosslinking component physically crosslinks the PVP by entanglement.

10. The wallboard of claim 7, wherein the organic crosslinking component chemically crosslinks the PVP.

11. The wallboard of claim 10, wherein the organic crosslinking component is PSS.

12. The wallboard of claim 11, wherein the hydrated, inorganic cementitious material is one of a hydrated hemihydrate or a hydrated anhydrite.

13. The wallboard of claim 5, wherein the organic crosslinking component is selected from the group of organic crosslinking components consisting of a poly(vinyl alcohol), a poly(acrylic acid), a copolymer of acrylic acid, a copolymer of methacrylic acid, a copolymer of styrene sulfonic acid, a copolymer containing salts of styrene sulfonic acid, a copolymer of acrylamido-2-methyl-1-propanesulfonic acid, and mixtures thereof.

14. The wallboard of claim 1, wherein the crosslinking component is a catalyst that initiates the formation of covalent bonds between polymer chains of the strengthening component.

15. The wallboard of claim 7, wherein the organic crosslinking component is at least one of a polysulfonate, a polycarboxylate, or a polyphosphate.

16. The wallboard of claim 1, wherein the hydrated inorganic cementitious material is a hydrated calcium sulfate anhydrite.

17. The wallboard of claim 1, wherein the hydrated inorganic cementitious material is a hydrated calcium sulfate hemihydrate.

18. A composition of matter comprising a strengthening component selected from the group of strengthening components consisting of PVP, a vinyl pyrrolidone copolymer, a vinyl caprolactam copolymer, and mixtures thereof; PSS; and a hydrated inorganic cementitious material, wherein the strengthening component is crosslinked by the PSS after mixing the strengthening component with the inorganic cementitious material, and wherein the strengthening component has a molecular weight of at least about 100,000 and PSS has a molecular weight of at least 70,000.

19. The composition of matter of claim 18, wherein the molecular weight of strengthening component is no greater than 1.3 million.

20. A cementitious building material comprising:
a water-dispersible organic strengthening component having a high molecular weight;
an organic crosslinking component having a molecular weight of at least 70,000, wherein the organic crosslinking component is selected to crosslink the organic strengthening component; and
a hydrated, inorganic cementitious material, wherein the crosslinked organic strengthening component has an affinity for the inorganic cementitious material, wherein a crosslinked molecular network forms upon drying of the hydrated, inorganic cementitious material, wherein the crosslinked molecular network is co-continuous with the hydrated, inorganic cementitious material, such that the cementitious building material is substantially strengthened.

21. The cementitious building material of claim 20, wherein the shape of the cementitious building material is in the form of a sheet.

22. The cementitious building material of claim 21, wherein the cementitious building material is used as wallboard.

23. The cementitious building material of claim 22, further comprising at least one layer of paper, wherein the at least one layer of paper is applied to at least one surface of the sheet.

24. The cementitious building material of claim 22, wherein no paper is applied to the surface of the sheet.

25. The cementitious building material of claim 24, further comprising a surface modifying additive that segregates to a stratified layer on at least one surface of the sheet.

26. The cementitious building material of claim 25, wherein the surface modifying additive is not the same substance as either of the strengthening component or the crosslinking component.

27. The cementitious building material of claim 26, wherein the surface modifying additive is a polyurethane dispersion.

28. A method of preparing a composite cementitious building material comprising
mixing an organic strengthening component having a high molecular weight, an organic crosslinking component, and an inorganic cementitious material wherein the organic strengthening component is added in a proportion no greater than 2 wt % of the inorganic cementitious material and;
adding the mixture prepared by the step of mixing to water;
stirring the water and the mixture prepared by the step of mixing to form a slurry, wherein the organic strengthening component is crosslinked by the organic crosslinking component causing the organic strengthening component to form a gel within the slurry;
forming the slurry into a shape; and
drying the slurry.

29. The method of claim 28, wherein the step of forming creates a sheet having a length, a width and a thickness, wherein the thickness is much less than the length and the width of the sheet.

30. The method of claim 29, further comprising:
applying at least one layer of paper on at least one surface of the flat sheet.

31. The method of claim 29, further comprising:
adding at least one surface modifying addition that segregates to the surface of the flat sheet, wherein the at least one surface modifying addition forms at least one stratified layer on the surface of the flat sheet.

32. The method of claim 31, wherein no paper is applied to the surface of the composite cementitious building material.

33. The method of claim 31, wherein the surface modifying addition is not the same substance as either the strengthening component or the crosslinking component.

34. The method of claim 33, wherein the surface modifying addition is a polyurethane dispersion.

35. A composition of matter comprising:
a water-dispersible organic strengthening component with a high molecular weight, wherein the water-dispersible organic strengthening component is crosslinked by a catalytic crosslinking component; and
a hydrated, inorganic cementitious material, wherein the catalytic crosslinking component crosslinked the water-dispersible organic strengthening component in situ such that the crosslinked organic strengthening component forms a network with the hydrated, inorganic cementitious material, whereby diffusion of the water-dispersible organic strengthening component to the surface of the composition of matter during drying is substantially reduced.

36. The composition of matter of claim 35, wherein the water-dispersible organic strengthening component is poly (vinyl pyrrolidone).

37. The composition of matter of claim 36, wherein the catalytic crosslinking component is an aqueous solution comprising hydrogen peroxide.

38. The composition of matter of claim 37, wherein the aqueous solution further comprises copper (II) chloride.

39. A composition of matter comprising:
poly(vinyl pyrrolidone) with a molecular weight at least about 100,000;
a crosslinking component; and
an inorganic cementitious material, wherein the poly (vinyl pyrrolidone) is crosslinked by the crosslinking component in a molecularly crosslinked network with the inorganic cementitious material, such that the nail pull resistance of the composition of matter is substantially improved compared to a composition of matter absent the poly(vinyl pyrrolidone) crosslinked by the crosslinking component.

40. A molded article comprising;
PVP having a molecular weight of at least 100,000;
PSS having a molecular weight of at least 70,000; and
a hydrated inorganic cementitious material, wherein the PVP is crosslinked in situ by the PSS, and wherein the crosslinked PVP forms a crosslinked molecular net work with the hydrated inorganic cementitious material.

41. A cement for use in construction, comprising:

PVP having a molecular weight of at least about 100,000;

A crosslinking component; and an inorganic cementitious material, wherein the crosslinking component is selected to crosslink the PVP when mixed with water.

42. The cement of claim 41, wherein the crosslinking component is selected to be temperature sensitive, wherein the reaction leading to crosslinking of the PVP occurs within a desired temperature range.

43. A concrete incorporating the cement of claim 41.

44. A joint compound incorporating the composition of matter of claim 18.

45. An adhesive incorporating the composition of matter of claim 18.

46. The wallboard of claim 11, wherein the hydrated, inorganic cementitious material is hydrated calcium sulfate anhydrite.

47. The composition of matter of claim 18, wherein the strengthening component is PVP.

48. The composition of matter of claim 18, wherein the strengthening component is vinyl pyrrolidone copolymer.

49. The composition of matter of claim 18, wherein the strengthening component is a vinyl caprolactam copolymer.

50. The wallboard of claim 1, wherein the core has a reduced density by addition of porosity.

* * * * *

UNITED STATES PATENT AND TRADEMARK OFFICE
CERTIFICATE OF CORRECTION

| | | |
|---|---|---|
| PATENT NO. | : 7,105,587 B2 | |
| APPLICATION NO. | : 10/278214 | |
| DATED | : September 12, 2006 | |
| INVENTOR(S) | : Christopher D. Tagge et al. | |

It is certified that error appears in the above-identified patent and that said Letters Patent is hereby corrected as shown below:

Title Page
At item (74) Attorney, Agent, or Firm--, please change the name of the firm and attorney from "Fowler White Boggs Hanker P.A." to --Fowler White Boggs Banker, P.A.--.

Signed and Sealed this

Thirteenth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,105,587 B2  Page 1 of 1
APPLICATION NO. : 10/278214
DATED : September 12, 2006
INVENTOR(S) : C. Tagge et al.

It is certified that error appears in the above-identified patent and that said Letters Patent is hereby corrected as shown below:

Please amend claims 5 and 40 should read:

5. The wallboard of claim 1, wherein the organic strengthening component is selected from an organic strengthening component consisting of a polyacrylamide, [[.]] poly(acrylamide-2-methyl-1-propane sulfonic acid), poly(vinyl caprolactam), poly(2-ethyl-2-oxazoline), poly(vinyl pyridine), poly(vinyl imidazole), an acrylamide copolymer, a 2-ethyl-2-oxazoline copolymer, a vinyl caprolactam copolymer, a vinyl pyridine copolymer, a vinyl imidazole copolymer, and combinations thereof.

40. A molded article comprising:[[;]] PVP having a molecular weight of at least 100,000; PSS having a molecular weight of at least 70,000; and a hydrated inorganic cementitious material, wherein the PVP is crosslinked in situ by the PSS, and wherein the crosslinked PVP forms a crosslinked molecular network with the hydrated inorganic cementitious materials.

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,105,587 B2  Page 1 of 1
APPLICATION NO. : 10/278214
DATED : September 12, 2006
INVENTOR(S) : C. Tagge et al.

It is certified that error appears in the above-identified patent and that said Letters Patent is hereby corrected as shown below:

Please amend claims 5 and 40 should read:

Column 18, lines 24-32 should read
5. The wallboard of claim 1, wherein the organic strengthening component is selected from an organic strengthening component consisting of a polyacrylamide, [[.]] poly(acrylamide-2-methyl-1-propane sulfonic acid), poly(vinyl caprolactam), poly(2-ethyl-2-oxazoline), poly(vinyl pyridine), poly(vinyl imidazole), an acrylamide copolymer, a 2-ethyl-2-oxazoline copolymer, a vinyl caprolactam copolymer, a vinyl pyridine copolymer, a vinyl imidazole copolymer, and combinations thereof.

Column 20, line 62 thru Column 21, line 2 should read
40. A molded article comprising:[[;]] PVP having a molecular weight of at least 100,000; PSS having a molecular weight of at least 70,000; and a hydrated inorganic cementitious material, wherein the PVP is crosslinked in situ by the PSS, and wherein the crosslinked PVP forms a crosslinked molecular network with the hydrated inorganic cementitious materials.

This certificate supersedes the Certificate of Correction issued September 23, 2008.

Signed and Sealed this

Fourteenth Day of October, 2008

JON W. DUDAS
*Director of the United States Patent and Trademark Office*